United States Patent Office 2,999,079
Patented Sept. 5, 1961

2,999,079
VULCANIZING BUTYL RUBBER IN THE PRESENCE OF HALOGENATED HETEROCYCLIC COMPOUNDS
James V. Fusco, Westfield, and Samuel B. Robison, Roselle, N.J., assignors to Esso Research and Engineering Company, a corporation of Delaware
No Drawing. Filed Nov. 29, 1957, Ser. No. 699,522
12 Claims. (Cl. 260—38)

The present invention relates to vulcanizing rubbery polymers in the presence of halogenated heterocyclic compounds as well as to the outstanding vulcanizates obtained. More specifically, it concerns reacting low unsaturation isoolefin-multiolefin polymers with nitrogen-containing halogenated heterocyclic compounds, in the presence or absence of compounding ingredients such as pigments, etc., and curing them with polymethylol phenol substances.

Heretofore butyl rubber has been cured with dimethylol para-hydrocarbon substituted phenols which are either monomeric or polymeric in form, the latter being generally preferred. However, these curing systems are slow and do not always produce vulcanizates having the desired modulus and hysteresis properties.

It has now been found that by curing butyl in the presence of a halogenated amine, having a heterocyclic structure, it is possible to obtain a vulcanizate having extraordinary moduli, heat resistance and hysteresis properties.

In one embodiment the polymer is heated with the halogenated amine at a temperature sufficiently high to cause the two substances to combine. This temperature, depending on the individual conditions, may vary between 100 and 400° F., although in most cases it is necessary to warm the mixture to a temperature above about 150° F. in order to obtain a substantial reaction between the two substances. For most purposes the modification should be carried out at from about 200 to 320° F. for say from about 10 seconds up to 30 minutes, and preferably for 1 to 5 minutes, depending on the temperature employed; higher temperatures require less time. The pressure is not important and generally is approximately atmospheric. The polymer is then cured with a polymethylol-hydrocarbon substituted phenol.

The effect of the modification on the vulcanizate is noticeable even when a small amount of the heterocyclic compound is combined with butyl. This is especially true when butyl and say trihalomelamine are heated in the presence of a pigment, such as carbon black or clay. It is believed that the heterocyclic compound not only combines with the butyl rubber but also with pigment, especially when the latter contains oxy groups on its surface. For instance a channel black, which has or has not been previously attrited, may be bonded to the isoolefin-multiolefin polymer by means of trichloromelamine by mixing the components in a Banbury for 5 minutes at 250° F.

To be specific, about 0.1 to 20 parts by weight (phr.) of the halogenated heterocyclic amine compound may be compounded with 100 parts of butyl in any conventional manner, such as on a mill or in an internal mixer. The amount will vary according to the unsaturation of the polymer, the properties which the vulcanizate is to have, whether there are other reactive ingredients present, etc. For example, when a pigment is present, about 0.5 to 3 phr. will suffice, while in other instances 0.5 to 15 phr. may be necessary.

The expression "butyl rubber" as employed in the specification and claims is intended to include copolymers of an isoolefin which has about 4–7 carbon atoms, and a conjugated multiolefin having about 4–14 carbon atoms. It is described in an article by R. M. Thomas et al. in Industrial Engineering and Chemistry, vol. 32, pages 1283 et seq., October 1940.

In preparing butyl rubber, the isoolefin and multiolefin are mixed in the ratio of a major proportion of the multiolefin, the preferred range being about 70 to 99.5, preferably 85 to 99.5 parts by weight of the isoolefin to about 30 to 0.5, preferably 0.5 to 15 parts by weight of the multiolefin. High purity is desirable in both materials, it being preferable to use an isoolefin of at least 98% purity, although satisfactory copolymers may be made from multiolefins of a lower purity.

In general, the rubber comprises the reaction product of a $C_4$ to $C_7$ isoolefin, such as isobutylene or 2-methyl-1-butene, with a $C_4$ to $C_{10}$ conjugated diolefin, such as isoprene, butadiene or piperylene. The reaction product of isobutylene and isoprene is preferred. For instance, 97 to 97.5% by weight of isobutylene is reacted with 2.5 to 3% by weight of isoprene.

The polymer has a Staudinger molecular weight between approximately 20,000 to 150,000. It is desired that the molecular weight fall between about 35,000 and 100,000 and it is preferred that it be in the range between 45,000 and 60,000. The material has a Wijs iodine number between about 0.5 and 50, generally between about 1 and 15. The preparation of the above rubbery butyl copolymer is described in U.S. Patent No. 2,356,128 to which reference may be had for further details.

The polymethylol phenol vulcanizing agents employed in the practice of this invention are prepared by reacting a substituted phenol having the 2 ortho positions unoccupied, with a considerable molar excess of formaldehyde, the molar ratio of formaldehyde to phenol typically being 2:1, in the presence of a strong alkaline catalyst, especially an alkali metal hydroxide, which is subsequently neutralized. The mixture of phenol, formaldehyde and alkaline catalyst is heated between 25 to 100° C., the first stage of the reaction involving the formation of the phenol methylol, that is, the para substituted 2,6-dimethylol phenol. This material, which is a dimethylol phenol, can be isolated by acidification of the mixture and separation of the oily layer. It can then be advanced to higher molecular weight formed by heating between about 75 and 175° C. This higher molecular weight form is oil-soluble and heat reactive, and has the advantage that it more reactive to rubber than the lower molecular weight form. Care should be taken to stop while the resin is in a soluble, fusible and heat reactive state. The phenol from which the polymethylol phenol is made generally has a hydrocarbon group in the position para to the phenolic hydroxyl, examples being alkyl groups, especially alkyl groups having from 3 to 20 carbon atoms, tertiary butyl and tertiary octyl (alpha, alpha, gamma, gamma-tetra-methyl butyl) being especially preferred.

Examples of suitable dimethylol phenols that may be used in the invention either in the polymeric or monomeric form are 2,6-dimethylol-4-methyl phenol, 2,6-dimethylol-4-tertiary butyl phenol, 2,6-dimethylol-4-octyl phenol, 2,6-dimethylol-4-dodecyl phenol and 2,6-dimethylol-4-phenyl phenol.

Generally between about 5 and 20 parts by weight of these non-sulfur containing vulcanizing agents are employed per 100 parts of rubber, but it is preferred to use between about 8 and 15 parts by weight.

The heterocyclic compounds used to modify the butyl polymer are nitrogen-containing halogenated heterocyclic compounds, preferably having more than 1 nitrogen atom in the heterocyclic group and more than one amine attached to said group. The most suitable compounds are the halomelamines, such as trichloromelamine, tribromomelamine, N,N,dichloromelamine and N,N,dibromomelamine. Other heterocyclic compounds that may be used in accordance with the invention are halogen derivatives of cyclic amidines in which the amido group is part of the ring, such as alpha aminodihydropyridine, 2-aminodihydropyrimidine, 2-aminopyrazine and the like.

The butyl polymer may be compounded according to conventional methods with the usual ingredients, such as basic metal compounds, e.g. zinc oxide, tackifiers, plasticizers and pigments. A typical recipe is as follows:

| Ingredient: | Parts by weight |
| --- | --- |
| Butyl rubber | 100 |
| Divalent metal oxide | 2 to 20 |
| Filler | 25 to 100 |
| Anti-oxidant | 1 to 2 |
| Heterocyclic compound | 0.1 to 20 |
| Plasticizer (paraffinic oil) | 3 to 30 |
| Curing agent | 1 to 20 |

The modified butyl may be rapidly cured at temperatures ranging from 250 up to about 400° F., or to a temperature at which the polymer begins to deploymerize. Because curing is a chemical reaction it varies with the time and temperature; generally speaking a satisfactory cure is obtained at these temperatures after 5 to 100 minutes, e.g. 20–40 minutes at 320° F.

According to one embodiment of the invention butyl is heat treated for 5 minutes at 300° F. in the presence of a halomelamine, compounded with zinc oxide, dimethylol phenol resin and stearic acid and cured with p-octyl dimethylol phenol resin at 310° F. In another embodiment a substantial amount of mineral filler or carbon black is present during the heat treatment. In both embodiments the vulcanizate produced is superior to conventional butyl rubber cured in the identical manner. Generally the modulus at 300% elongation will vary from about 1000 up to 2000 p.s.i. or more which is substantially greater than the modulus obtained with the same cure in the absence of the amine.

Among the many uses for the modified butyl rubber vulcanizate obtained in accordance with the present invention are incorporation in steam hoses, automobile tires, conveyor belts, curing bladders and the like.

The advantages of the invention will be better understood by the following examples:

EXAMPLE 1

Isobutylene-isoprene butyl polymer (GR-I-17) having a viscosity average molecular weight of 420,000 (equal to a Staudinger molecular weight of about 42,000) and a mole percent unsaturation of 1.45 was compounded as follows:

| Ingredient: | Parts by weight |
| --- | --- |
| Butyl rubber (GR-I-17) | 100 |
| MPC carbon black | 50 |
| Stearic acid | 0.5 |

The batch was divided into four parts and 2 phr. of trichloromelamine was added to two of the portions. One of the latter two portions and one of the other portions were heated on a laboratory mill for 5 minutes at 300° F., prior to curing all four portions with 5 phr. of zinc oxide and 12 phr. of Amberol ST-137 for 40 minutes at 307° F.

Amberol ST-137, which is made by Rohm & Haas Co., is the condensation product of p-octyl phenol and formaldehyde. The condensation is carried out in the presence of sodium hydroxide. The methylol content is between 5 and 6.0%.

The stress-strain data are presented in Table I:

Table I

EFFECT OF MODIFYING BUTYL WITH HALOMELAMINE PRIOR TO CURING WITH RESIN

| Properties | Control | | Trichloromelamine | |
| --- | --- | --- | --- | --- |
|  | A | B | C | D |
| Tensile Strength, p.s.i | 1,400 | 1,900 | 850 | 1,950 |
| Modulus @ 300%, p.s.i | 160 | 320 | 220 | 1,120 |
| Elongation, percent | 1,100 | 860 | 980 | 460 |

A and C—not heat treated.
B and D—heat treated.

The results show that when butyl is heated in the presence of trichloromelamine prior to vulcanization with a polymethylol-p-substituted phenol resin it combines with the amine and produces a vulcanizate having extraordinary properties. This is evident from the modulus at 300% which, in the case of the heat treated trichloromelamine, increased 900 p.s.i. (column C vs. column D).

EXAMPLE 2

In another series experiments varying quantities of trichloromelamine were added to a master batch, which was the same as the butyl rubber recipe described in Example 1, with the exception that 10 phr. of Amberol ST-137 or SP-1045 (a condensation product of p-octyl phenol and formaldehyde having a methylol content of 9 to 9.5%) was used to cure the compounded rubber after it was hot milled for 5 minutes at 300° F. with from 0.5 to 5 phr. of trichloromelamine. In each case the compounded butyl was warmed to 180° F. to disperse the curing agents (condensation product and 5 phr. of zinc oxide) prior to vulcanizing for 60 minutes at 307° F.

Table II

EFFECT OF VARYING THE AMOUNT OF HALOMELAMINE

| | Amount of Trichloromelamine (phr.) | | | | |
| --- | --- | --- | --- | --- | --- |
| | 0.5 | 1.0 | 2.0 | 3.0 | 5.0 |
| Stress-Strain Properties: | | | | | |
| Tensile Strength, p.s.i | 2,020 | 1,960 | 1,990 | 2,030 | 1,480 |
| Modulus at 300%, p.s.i | 670 | 740 | 1,020 | 1,400 | ---- |
| Elongation, Percent | 630 | 605 | 500 | 425 | 285 |

All of the above properties were obtained with Amberol ST-137 vulcanizates. When the same butyl modified with 2.0 phr. of trichloromelamine was cured as above with 10 phr. of SP-1045 resin, the modulus at 300% was 1260 p.s.i. Thus, it has been shown that halogen derivatives of cyclic amidines improve both the stress-strain and dynamic properties of butyl rubber. The improved vulcanizate is more suitable for use in articles such as tires which are continuously subjected to severe conditions. The results illustrate that heat treating butyl with say 2-3 phr. of a halomelamine will greatly enhance its commercial value in certain articles. Similar results can be obtained with both chloro and bromo melamines.

Resort may be had to various modifications and variations of the present invention without departing from the spirit of the discovery or the scope of the appended claims.

What is claimed is:

1. Method of vulcanizing 100 parts by weight of low unsaturation isobutylene-isoprene rubbery polymer having a Wijs iodine number between 0.5 and 50 comprising mixing said polymer with about 0.1 to 20 parts by weight of halomelamine and a filler selected from the group consisting of carbon black, mineral filler, and mixtures thereof, heating the resulting composition to 100 to 400° F. for 10 seconds to 30 minutes, adding about 1 to 20 parts by weight of dimethylol-p-$C_3$ to $C_{20}$ alkyl phenol resin to the heated polymer-halomelamine composition and heating the resulting mixture to about 250 to 400° F. until the polymer is vulcanized.

2. Method according to claim 1 in which there is 25 to 100 parts by weight of a filler selected from the group consisting of carbon black, mineral filler, and mixtures thereof present during the first heating step.

3. Method according to claim 2 in which the filler is carbon black.

4. Method of vulcanizing 100 parts by weight of an isobutylene-isoprene rubbery polymer having a Wijs iodine number of about 1–50 and containing about 0.5 to 15 wt. percent isoprene comprising mixing said polymer with about 0.1 to 20 parts by weight of trichloromelamine and about 25 to 100 parts by weight of carbon black, heating the composition to about 200 to 320° F. for 10 seconds to 30 minutes, adding about 1 to 20 parts by weight of dimethylol-p-octyl phenol resin and heating the mixture to about 250 to 400° F. for from 5 to 100 minutes.

5. A method of vulcanizing 100 parts by weight of a low unsaturation isobutylene-isoprene rubbery polymer having a Wijs iodine No. between 0.5 and 50 which comprises, mixing said polymer with 0.1 to 20 parts by weight of a halomelamine and a filler selected from the group consisting of carbon black, mineral filler, and mixtures thereof, heating the resulting composition for 10 seconds to 30 minutes at a temperature of 100° to 400° F., thereafter mixing the heated polymer-halomelamine composition with about 1 to 20 parts by weight of a polymethylol-p-$C_3$ to $C_{20}$ hydrocarbon substituted phenol substance, and heating the resulting mixture to a temperature of about 250° to 400° F. to vulcanize the polymer.

6. A vulcanizate comprising a low unsaturation isoolefin-multiolefin rubbery copolymer of a major portion of a $C_4$ to $C_7$ isoolefin and a minor portion of a $C_4$ to $C_{10}$ multiolefin which has a Wijs iodine No. between 0.5 and 50, vulcanized with a minor portion of a polymethylol-p-$C_3$ to $C_{20}$ hydrocarbon substituted phenol substance, said copolymer having been heat reacted prior to compounding for vulcanization with 0.1 to 20 weight percent based on copolymer of a halomelamine in the presence of a filler selected from the group consisting of carbon black, mineral filler, and mixtures thereof, said copolymer and said halomelamine having been mixed and the resulting composition heated prior to incorporation of said phenol substance to a temperature of 100° to 400° F. for a period of about 10 seconds to 30 minutes.

7. A vulcanizate according to claim 6 in which the halomelamine is trichloromelamine.

8. A vulcanizate according to claim 6 in which the amount of halomelamine is 0.5 to 5 parts by weight.

9. A vulcanizate according to claim 6 in which the polymer-halomelamine composition is heated to a temperature of 100 to 400° F.

10. A vulcanizate comprising 100 parts by weight of a low unsaturation issoolefin-conjugated diolefin rubbery polymer having a Wijs iodine No. between 0.5 and 50 vulcanized with about 1 to 20 parts by weight of a dimethylol-p-$C_3$ to $C_{20}$ hydrocarbon substituted phenol substance, said polymer, prior to admixture with said phenol substance having been heat interacted at 100° to 400° F. for 10 seconds to 30 minutes with about 0.1 to 20 parts by weight of halomelamine in the presence of a filler selected from the group consisting of carbon black, mineral filler, and mixtures thereof.

11. A vulcanizate having a Staudinger molecular weight of 20,000 to 150,000 and a 300% modulus of 1,000 to 2,000 p.s.i. comprising, 100 parts by weight of a low unsaturation isobutylene-isoprene rubbery polymer having a Wijs iodine No. between 0.5 and 50 vulcanized with about 1 to 20 parts by weight of dimethylol-p-$C_3$ to $C_{20}$ alkyl phenol resin, said polymer, prior to admixture with said phenol resin, having been heat interacted at a temperature of 100° to 400° F. for 10 seconds to 30 minutes with about 0.1 to 20 parts by weight of trihalomelamine and 25 to 100 parts by weight of a filler selected from the group consisting of carbon black, mineral filler, and mixtures thereof.

12. A method of vulcanizing a low unsaturation isobutylene-multiolefin rubbery polymer having a Wijs iodine No. between 0.5 and 50, which comprises, mixing 100 parts by weight of said polymer with 0.1 to 20 parts by weight of a trihalomelamine and 25 to 100 parts by weight of a filler selected from the group consisting of carbon black, mineral filler, and mixtures thereof, heating the resulting composition at 100° to 400° F. for 10 seconds to 30 minutes so as to heat interact said polymer and said trihalomelamine, mixing the polymer-trihalomelamine composition with a minor amount of dimethylol-p-$C_3$ to $C_{20}$ hydrocarbon substituted phenol substance, and heating the resulting mixture at about 250° to 400° F. until the polymer is vulcanized.

References Cited in the file of this patent

UNITED STATES PATENTS

| | | |
|---|---|---|
| 2,171,901 | Wilson et al. | Sept. 5, 1939 |
| 2,749,323 | Schaeffer et al. | June 5, 1956 |

OTHER REFERENCES

Doak et al.: Canadian Journal of Technology, 1955, vol. 33, pages 98–109.